(12) United States Patent
Yousef et al.

(10) Patent No.: US 10,738,233 B2
(45) Date of Patent: Aug. 11, 2020

(54) PRESSURE PULSE ASSISTED INJECTION WATER FLOODING PROCESSES FOR CARBONATE RESERVOIRS

(71) Applicant: Saudi Arabian Oil Company, Dhahran (SA)

(72) Inventors: Ali Yousef, Dhahran (SA); Subhash Ayirala, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 15/591,810

(22) Filed: May 10, 2017

(65) Prior Publication Data

US 2018/0327650 A1 Nov. 15, 2018

(51) Int. Cl.
C09K 8/58 (2006.01)
C09K 8/588 (2006.01)
E21B 43/20 (2006.01)

(52) U.S. Cl.
CPC .............. *C09K 8/58* (2013.01); *C09K 8/588* (2013.01); *E21B 43/20* (2013.01)

(58) Field of Classification Search
CPC ........... C09K 8/58; C09K 8/588; E21B 43/20
USPC .................................................... 166/305.1
See application file for complete search history.

(56) References Cited

U.S. PATENT DOCUMENTS

| | | | |
|---|---|---|---|
| 3,333,634 A | 8/1967 | Townsend et al. | |
| 3,428,127 A | 2/1969 | Atkins, Jr. | |
| 3,480,081 A | 11/1969 | Felsenthal et al. | |
| 4,478,283 A | 10/1984 | Sydansk | |
| 7,987,907 B2 | 8/2011 | Collins et al. | |
| 8,166,992 B2 | 5/2012 | Samaroo | |
| 8,316,944 B2 | 11/2012 | Pringle et al. | |
| 8,544,552 B2 * | 10/2013 | Davidson | E21B 43/168 166/319 |
| 8,550,163 B2 | 10/2013 | Al-Yousif et al. | |
| 8,567,505 B2 | 10/2013 | Davidson | |
| 8,596,300 B2 | 12/2013 | Graham et al. | |
| 8,656,996 B2 | 2/2014 | Willingham et al. | |
| 8,657,000 B2 | 2/2014 | Willingham et al. | |
| 8,739,869 B2 | 6/2014 | Willingham et al. | |
| 9,194,211 B2 | 11/2015 | Lefebvre | |
| 2011/0306525 A1 * | 12/2011 | Lighthelm | C09K 8/58 507/225 |

(Continued)

OTHER PUBLICATIONS

Avagnina, Daniel, et al.; "An Innovative Waterflood Optimization Method for Unconsolidated Sandstone Reservoirs to Increase Oil Production, Lower Water-Cut, and Improve or Stabilize Base Oil Decline Rate" Pan American Mature Fields Congress 2015; pp. 1-1.

(Continued)

*Primary Examiner* — William D Hutton, Jr.
*Assistant Examiner* — Ashish K Varma
(74) *Attorney, Agent, or Firm* — Bracewell LLP; Constance G. Rhebergen; Brian H. Tompkins

(57) ABSTRACT

A method for recovering oil from a hydrocarbon-bearing reservoir using pressure pulse injections of an aqueous salt solution is provided. The aqueous salt solution includes one or more salts suitable for enhancing oil recovery in carbonate reservoirs and has a salinity in the range of about 5,000 parts-per-million (ppm) total dissolved solids (TDS) to about 7,000 ppm TDS. The aqueous salt solution may be injected into a reservoir using continuous or periodic pressure pulse injections.

16 Claims, 2 Drawing Sheets

(56) References Cited

U.S. PATENT DOCUMENTS

2016/0289539 A1 10/2016 Jangda et al.
2016/0298426 A1* 10/2016 Brodie .................... E21B 43/20

OTHER PUBLICATIONS

Davidson, Brett, et al.; "Revitalizing Mature Oil Assets an Introduction to Powerwave Technology" available as of May 10, 2017 at the website: http://www.onthewavefront.com/inc/pdfs/tech/powerwave/articles/davidson_kansas_paper.pdf; pp. 1-10.
Groenenboom, Jeroen, et al.; "Pulsed Water Injection During Waterflooding" SPE 84856, Society of Petroleum Engineers International Improved Oil Recovery Conference, Kuala Lumpur, Malaysia, Oct. 20-21, 2003; pp. 1-16.
Spanos, T., et al; "Pressure Pulsing at the Reservoir Scale: A New IOR Approach" Journal of Canadian Petroleum Technology, Feb. 2003, vol. 42, No. 2; pp. 1-13.
Yousef, Ali A., et al.; "Laboratory Investigation of the Impact of Injection-Water Salinity and Ionic Content on Oil Recovery from Carbonate Reservoirs" SPE 137634, SPE Canadian Unconventional Resources and International Petroleum Conference, Calgary, AB, Oct. 19-21, 2010; pp. 578-593.
Yousef, Ali A., et al.; "SmartWater Flooding: Industry's First Field Test in Carbonate Reservoirs" SPE 159526, SPE Annual Technical Conference and Exhibition, San Antonio, TX, Oct. 8-10, 2012; pp. 1-26.
International Search Report and Written Opinion for International Application No. PCT/US2018/031937; International Filing Date May 10, 2018; Report dated Aug. 7, 2018 (pp. 1-11).
Kulathu et al. "Low salinity cyclic water floods for enhanced oil recovery on Alaska North Slope." SPE Asia Pacific Oil and Gas Conference and Exhibition. Society of Petroleum Engineers, 2013, pp. 1-14.
McGuire et al.: "Low Salinity Oil Recovery: An Exciting New EOR Opportunity for Alaska's North Slope", SPE Western Regional MEE, SPE, vol. 2, No. SPE 93903, Mar. 30, 2005, pp. 422-436.
Xie et al.: "Improved Oil Recovery From Carbonate Reservoirs by Chemical Stimulation", Sep. 2005 (Sep. 1, 2005), URL:https://WWW.onepetro.org/download/journal-paper/SPE-89424-PA?id=journal-paper/SPE-89424-PA pp. 276-285.

* cited by examiner

PRESSURE PULSE ASSISTED INJECTION WATER FLOODING PROCESSES FOR CARBONATE RESERVOIRS

BACKGROUND

Field of the Disclosure

Embodiments of the disclosure generally relate to formation treatment fluids and, more specifically, to enhanced oil recovery fluids.

Description of the Related Art

The use of enhanced oil recovery (EOR) processes has greatly benefited the oil and gas industry by increasing the production of problematic and underperforming hydrocarbon bearing wells and fields. The EOR processes used in modern oil and gas operations may include chemical, hydrochemical, thermal, fluid/superfluid and microbial based processes. Water injection (alternatively referred to as water flooding) has been widely used to increase the conductivity or flow of liquid hydrocarbons in subterranean reservoir treated using EOR techniques. The water source may be derived from freshwater (for example, aquifers or surface water) as well as saltwater/brackish sources (for example, river/sea water mixtures).

SUMMARY

The use of water flooding processes may be used in EOR operations in carbonate reservoirs. Some water flooding may use an ion-based (that is, salt-based) alteration of the injectable water typically used in water flooding. Such water flooding may also be used in both secondary (green field development) as well as tertiary recovery stages (brown field development), and may be generally regarded as environmentally safe. Such water flooding may have favorable interactions at the pore scale in a formation to improve microscopic sweep efficiency and release more oil from reservoir pores; however, the water flooding may be mobility constrained due to insufficient injection water viscosities, resulting in poor sweep efficiencies at the reservoir scale.

In one embodiment, a method for recovering oil from a hydrocarbon-bearing reservoir is provided. The method includes injecting, using a plurality of pressure pulses, an aqueous salt solution into a well in fluid communication with a hydrocarbon-bearing reservoir. The aqueous salt solution comprising one or more salts and a salinity of 5,000 parts-per-million total dissolved solids (ppm TDS) to 7,000 ppm TDS. In some embodiments, the well is an injection well. In some embodiments, the one or more salts include sodium chloride, calcium chloride, magnesium chloride, sodium sulfate, magnesium sulfate, sodium bicarbonate or any combination thereof. IN some embodiments, the aqueous salt solution comprises a mass ratio of monovalent ions to divalent ions in the range of 5 to 10. In some embodiments, the monovalent ions comprise at least one of sodium ions and chloride ions. In some embodiments, the divalent ions comprise at least one of calcium, magnesium, and sulfate ions. In some embodiments, the method includes preparing the aqueous salt solution at a surface before the injection. In some embodiments, the pressure differential between at least one of the plurality of pressure pulses and a formation pressure associated with the hydrocarbon-bearing reservoir is in the range of 200 pounds-per-square inch (psi) to about 800 psi. In some embodiments, the hydrocarbon-bearing reservoir comprises a carbonate reservoir. In some embodiments, the method includes comprising recovering displaced hydrocarbon from the hydrocarbon-bearing reservoir.

In another embodiment, a method for recovering oil from a hydrocarbon-bearing reservoir formation is provided. The method includes preparing an aqueous salt solution comprising one or more salts and a salinity of 5,000 parts-per-million total dissolved solids (ppm TDS) to 7,000 ppm TDS. The method further includes applying a first pressure pulse of the aqueous salt solution to the formation using a pressure pulse tool and applying a second pressure pulse of the aqueous salt solution to the formation using the pressure pulse tool. In some embodiments, the one or more salts include sodium chloride, calcium chloride, magnesium chloride, sodium sulfate, magnesium sulfate, and sodium bicarbonate, or any combination thereof. In some embodiments, the aqueous salt solution comprises a mass ratio of monovalent ions to divalent ions in the range of 5 to 10. In some embodiments, the monovalent ions comprise at least one of sodium ions and chloride ions. In some embodiments, the divalent ions comprise at least one of calcium, magnesium, and sulfate ions. In some embodiments, the pressure differential between the pressure pulse tool and a formation pressure associated with the formation is in the range of 200 pounds-per-square inch (psi) to about 800 psi. In some embodiments, the hydrocarbon-bearing reservoir comprises a carbonate reservoir. In some embodiments, the method includes recovering displaced hydrocarbon from the hydrocarbon-bearing reservoir. In some embodiments, preparing an aqueous salt solution includes diluting seawater with fresh water to achieve the salinity of 5,000 ppm TDS to 7,000 ppm TDS. In some embodiments, preparing the aqueous salt solution comprises adding at least one of the one or more salts to the diluted seawater.

DETAILED DESCRIPTION

The present disclosure will now be described more fully hereinafter with reference to the accompanying drawings, which illustrate embodiments of the disclosure. This disclosure may, however, be embodied in many different forms and should not be construed as limited to the illustrated embodiments set forth herein. Rather, these embodiments are provided so that this disclosure will be thorough and complete, and will fully convey the scope of the disclosure to those skilled in the art.

As used in the disclosure, the term "aqueous salt solution" refers to an aqueous solution of one or more salts suitable for enhancing oil recovery in carbonate reservoirs having a salinity in the range of about 5,000 parts-per-million (ppm) total dissolved solids (TDS) to about 7,000 ppm TDS, such that the aqueous solution includes a concentration of one or more of the following ions suitable for enhancing oil recovery: sodium, calcium, magnesium, sulfate, and chloride ions.

For example, a an aqueous solution may include one or more of the following salts suitable for enhancing oil recovery: sodium chloride (NaCl), calcium chloride ($CaCl_2$)), magnesium chloride ($MgCl_2$), sodium sulfate ($Na_2SO_4$) and magnesium sulfate ($MgSO_4$). In some embodiments, the aqueous salt solution may have an increased amount of divalent ions and a reduced amount of monovalent ions, as compared to other injection fluids or seawater. In some embodiments, the aqueous salt solution may have a mass ratio of monovalent ions (e.g., sodium and chloride ions) to divalent ions (e.g., calcium, magnesium, and sulfate ions) in the range of about 5 to about 10.

As used in the disclosure, "in situ" refers to an event or occurrence within a hydrocarbon reservoir including but not limited to methodologies, techniques and chemical reactions for enhancing hydrocarbon recovery from carbonate reservoirs. As used in the disclosure, the term "ppm" refers to parts-per-million by mass unless otherwise indicated.

As used herein, pressure pulse injection (also referred to as "pressure pulse technology" or "PPT") refers to pulsations of injection fluid that may be performed continuously or periodically. Pressure pulse injection generates localized porosity dilation waves of injection fluid that cause expansion and contraction of pores in the reservoir to generate a pulsating inflow and outflow that may increase fluid intake and unblocks plugged pores.

Figure 1:
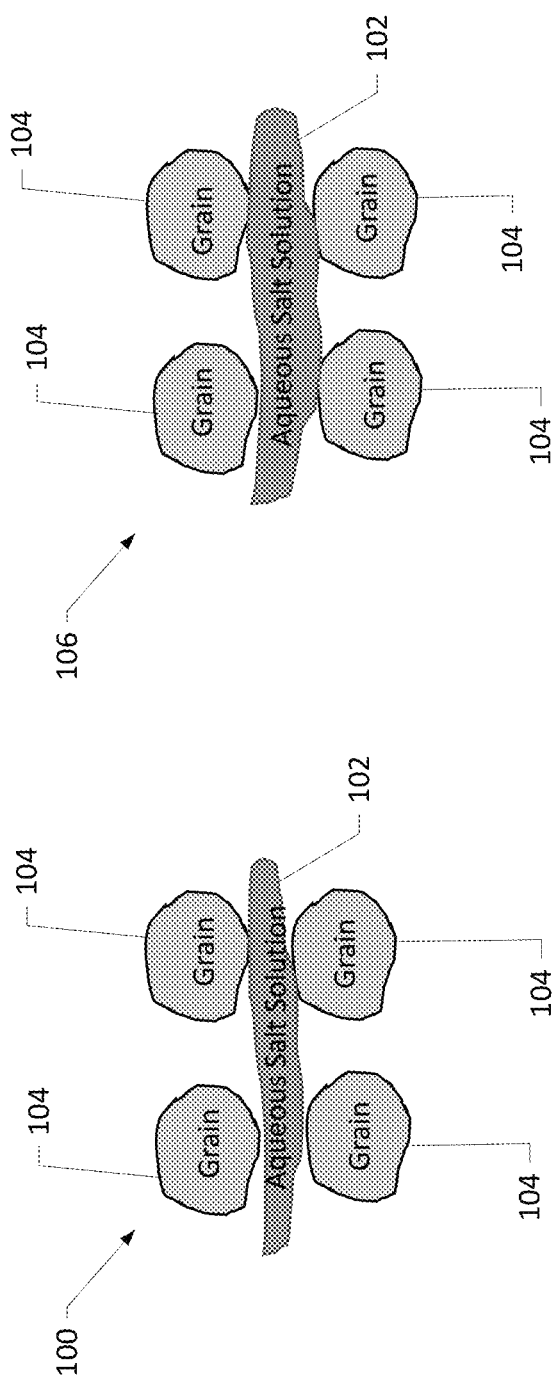
FIG. 1 depicts schematics of a prior art flooding process using an aqueous salt solution without pressure pulse injection and a flooding process using an aqueous salt solution and pressure pulse injection in accordance with an embodiment of the disclosure.

As shown in FIG. 1, embodiments of the disclosure include the pressure pulse injection of an aqueous salt solution to improve reservoir contact in EOR operations. FIG. 1 depicts a schematic 100 of a prior art flooding process using an aqueous salt solution without pressure pulse injection. The schematic 100 of FIG. 1 depicts interaction of an aqueous salt solution 102 with the grains 104 of a formation. As shown in FIG. 1, the use of the aqueous salt solution 102 without pressure pulse injection may result in a sweep efficiency having less volume and greater resistance than the embodiments of the disclosure described herein.

FIG. 1 also depicts a schematic 106 of a flooding process using an aqueous salt solution with pressure pulse injection in accordance with an embodiment of the disclosure. The schematic 106 of FIG. 1 depicts the improved interaction of the aqueous salt solution 102 with the grains 104 of a formation when the aqueous salt solution 102 is injected using pressure pulse injection. As shown in in FIG. 1, the use of the aqueous salt solution 102 with pressure pulse injection may result in a sweep efficiency having greater volume and less resistance than the prior art process depicted in schematic 100. Consequently, a greater oil recovery may be obtained as compared to conventional flooding compositions, resulting in improved economics (that is, lower cost) for oil recovery in carbonate reservoirs.

Embodiments of the disclosure may include the pressure pulse injection of oil recovery compositions that include an aqueous solution of one or more salts with a salinity of about 5,000 ppm to about 7,000 ppm. In some embodiments, an aqueous solution may include one or more salts that include but are not limited to sodium chloride (NaCl), calcium chloride ($CaCl_2$)), magnesium chloride ($MgCl_2$), sodium sulfate ($Na_2SO_4$) and magnesium sulfate ($MgSO_4$). Embodiments of the disclosure may include aqueous salt solutions having a concentration of one or more ions that include but are not limited to sulfate ions, calcium ions, magnesium ions, and chloride ions. In some embodiments, an aqueous solution in the oil recovery composition may include dilute seawater (that is, seawater diluted to achieve a salinity of about 5,000 ppm to about 7,000 ppm). In some embodiments, the dilute seawater may include the addition of one or more salts (for example, at least one of sodium chloride (NaCl), calcium chloride ($CaCl_2$)), magnesium chloride ($MgCl_2$), sodium sulfate ($Na_2SO_4$) and magnesium sulfate ($MgSO_4$)).

In some embodiments, an aqueous solution of one or more salts may include a polymer or other additive to further enhance oil recovery using the aqueous salt solution. In such embodiments, an oil recovery composition that includes the aqueous salt solution and the polymer.

In some embodiments, the aqueous solution of one or more salts may be derived from saltwater or brackish sources, such as seawater or river water. In some embodiments, the aqueous salt solution may be derived by diluting seawater to a desired salinity and ion composition. In some embodiments, the diluted seawater may be enriched with divalent ions to achieve a specific monovalent ion to divalent ion ratio. In some embodiments, the aqueous salt solution may be prepared at a well site using nearby sources of seawater or other water.

The aqueous salt solution describe herein may be injected into a formation in a well (for example, a producing well or an injection well) using a pressure pulse tool that pulsably injects a fluid into the well. In some embodiments, the pressure pulse tool may be a downhole tool inserted into a well. In some embodiments, for example, a pressure pulse tool may have a fluid accumulator, a valve, and a cylinder and piston arrangement to move fluid out of the tool and into a formation. In such embodiments, a pressure differential between the accumulator and the formation may act on the piston, in conjunction with a biasing component such a spring, to perform a pulsing cycle such that fluid is injected in pressure pulses. In such embodiments, for example, a pulsing cycle may include the following sequence: Initially, the valve of the pulsing tool may be closed such that fluid supplied to the pulsing tool increases pressure in the accumulator. When the pressure in the accumulator exceeds the formation pressure, the piston of the pulsing tool may move in response to the pressure differential and the valve may open, resulting in pressure fluid moving from the accumulator out from the tool and into the formation. Next, as pressure in the accumulator decreases and the formation pressure increase, the pressure differential may decrease and the biasing component may move the piston and close the valve. After the valve closes, the fluid pressure in the accumulator begins to increase again and the cycle repeats. In this manner, the aqueous salt solution may be injected into a formation in pressure pulses.

In some embodiments, the pressure differential between a tool and a formation pressure (that is, the corresponding pressure at which a pulse of aqueous salt solution is injected from the tool) may be in the range of about 200 pounds-per-square inch (psi) to about 800 psi.

It should be appreciated that the pulsing tool described above is merely one embodiment of a pulsing tool that may perform pressure pulse injection of the aqueous salt solution. In other embodiments, other pulsing tools may be used to pulsably inject the aqueous salt solution. In some embodiments, operation and selection of a pulsing tool may be based on, for example, the porosity and permeability of a formation, the degree of saturation of a formation, the recharge rate of fluid in the tool, and so on. As will be appreciated, various operating parameters of a pulsing tool may be considered for use in embodiments, such as the amplitude of the pulse waves, the rise time of the pulse waves, the fluid displacement efficiency, and the fluid injection rate.

The pressure pulse injection of an oil recovery composition of an aqueous solution of one or more salts having a salinity of about 5,000 ppm to about 7,000 ppm may be used to enhance oil recovery from carbonate reservoirs. In such embodiments, the pressure pulse injection of the oil recovery composition of an aqueous solution of one or more salts having a salinity of about 5,000 ppm to about 7,000 ppm into a hydrocarbon containing carbonate reservoir formation according to the processes described herein results in increased hydrocarbon production from the reservoir formation.

Figure 2:
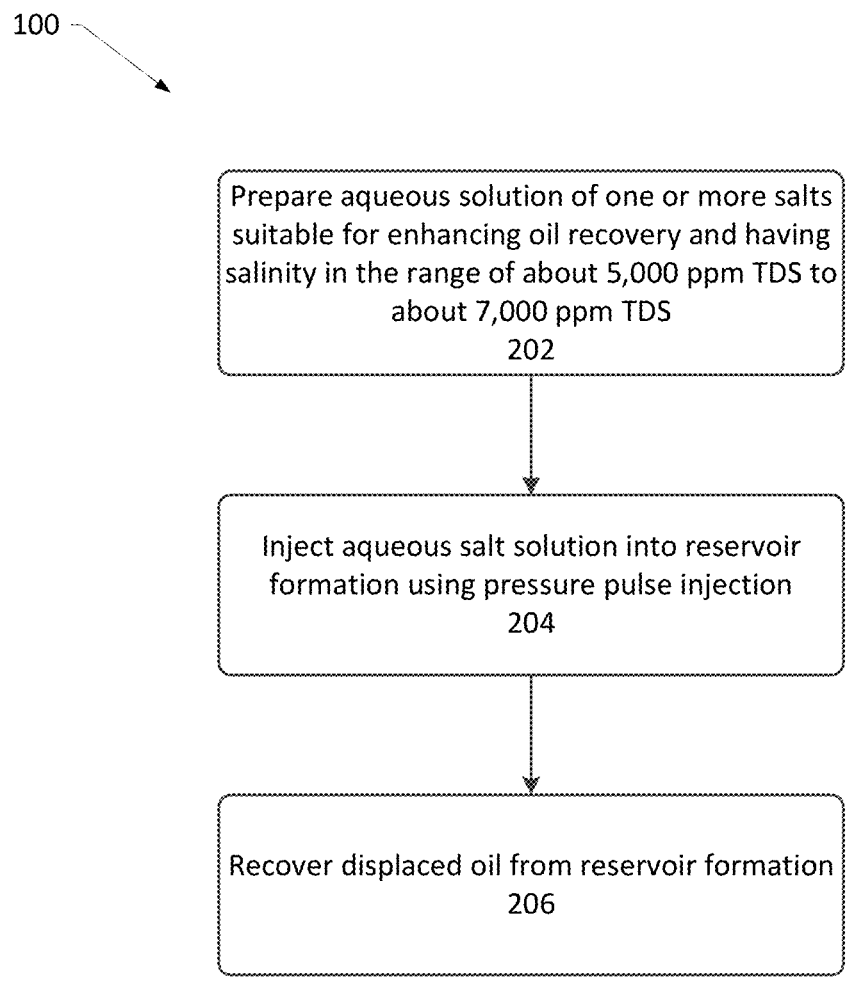
FIG. 2 is a block diagram of a process for performing a process for enhancing oil recovery by using pressure pulse injection of an aqueous salt solution in accordance with an embodiment of the disclosure.

FIG. 2 depicts a process 200 for enhancing oil recovery by injecting an oil recovery composition of an aqueous solution of one or more salts having a salinity of about 5,000 ppm to about 7,000 ppm using pressure pulse injection in accordance with an embodiment of the disclosure. As shown in FIG. 2, in some embodiments, an aqueous solution of one or more salts suitable for enhancing oil recovery and having a salinity in the range of about 5,000 to 7,000 is prepared (block 202). In some embodiments, the aqueous salt solution may be prepared by treating seawater (for example, water having a salinity in the range of 30,000 ppm TDS to 40,000 ppm TDS), fresh water (for example, water having a relatively low salinity (that is, less than 1,000 ppm TDS)), brackish water (for example, water having a salinity in the range of 1,000 ppm TDS to 4,000 ppm TDS), or a combination thereof. For example, in some embodiments, the aqueous salt solution may be prepared by diluting seawater to a desired salinity. In some embodiments, the prepare aqueous salt solution may have a mass ratio of monovalent ions (e.g., sodium and chloride ions) to divalent ions (e.g., calcium, magnesium, and sulfate ions) in the range of about 5 to about 10.

The aqueous salt solution may then be injected using pressure pulse injection (block 204). As described above, the pressure pulse injection may provide localized porosity dilation waves of the aqueous salt solution to generate a pulsating inflow and outflow that may increase fluid intake and unblocks plugged pores. As will be appreciated, the injection of the pressure pulse injected aqueous salt solution may be a function of, for example, injection pressure, rate of change of the amplitude of the pressure pulses, and dilative capacity of the reservoir rock. In some embodiments, the pressure pulse injection of aqueous salt solution may be performed in one or more injection wells in fluid communication with a producing well. After the pressure pulse injection of the aqueous salt solution, displaced oil may then be recovered from the reservoir formation (block 206). As will be appreciated, the use of pressure pulse injection with an aqueous salt solution may result in significantly lower injection volumes (and increased injectivity rates) than conventional water flooding or similar operations.

In some embodiments, the pressure pulse injection of an aqueous salt solution may be combined with other oil recovery techniques. For example, in some embodiments the pressure pulse injection of an aqueous salt solution may be performed, followed by injection of a different fluid (e.g., a polymer).

Advantageously, using pressure pulsing in injection wells in accordance with the techniques described herein improves the sweep efficiency of injected aqueous salt solutions. The techniques described herein may thus be used in flooding processes for better reservoir contact of the injection fluid to mobilize and push large amounts of un-swept oil towards producing wells.

Ranges may be expressed in the disclosure as from about one particular value, to about another particular value, or both. When such a range is expressed, it is to be understood that another embodiment is from the one particular value, to the other particular value, or both, along with all combinations within said range Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments described herein. It is to be understood that the forms shown and described herein are to be taken as examples of embodiments. Elements and materials may be substituted for those illustrated and described herein, parts and processes may be reversed or omitted, and certain features may be utilized independently, all as would be apparent to one skilled in the art after having the benefit of this description. Changes may be made in the elements described herein without departing from the spirit and scope of the disclosure as described in the following claims. Headings used herein are for organizational purposes only and are not meant to be used to limit the scope of the description.

What is claimed is:

1. A method for recovering oil from a hydrocarbon-bearing reservoir, comprising:
injecting, using a plurality of pressure pulses, an aqueous salt solution into a well in fluid communication with a hydrocarbon-bearing reservoir, the aqueous salt solution comprising one or more salts and a salinity of 5,000 parts-per-million total dissolved solids (ppm TDS) to 7,000 ppm TDS, wherein the pressure differential between at least one of the plurality of pressure pulses and a formation pressure associated with the hydrocarbon-bearing reservoir is in the range of 200 pounds-per-square inch (psi) to about 800 psi, wherein the aqueous salt solution comprises a mass ratio of monovalent ions to divalent ions in the range of 5 to 10, wherein the aqueous salt solution comprises sulfate ions.

2. The method of claim 1, wherein the well is an injection well.

3. The method of claim 1, wherein the one or more salts are selected from the group consisting of sodium chloride, calcium chloride, magnesium chloride, sodium sulfate, magnesium sulfate, and sodium bicarbonate.

4. The method of claim 1, wherein the monovalent ions comprise at least one of sodium ions and chloride ions.

5. The method of claim 1, wherein the divalent ions comprise calcium and magnesium ions.

6. The method of claim 1, comprising preparing the aqueous salt solution at a surface before the injection.

7. The method of claim 1, wherein the hydrocarbon-bearing reservoir comprises a carbonate reservoir.

8. The method of claim 1, comprising recovering displaced hydrocarbon from the hydrocarbon-bearing reservoir.

9. A method for recovering oil from a hydrocarbon-bearing reservoir formation, comprising:
preparing an aqueous salt solution comprising one or more salts and a salinity of 5,000 parts-per-million total dissolved solids (ppm TDS) to 7,000 ppm TDS, wherein the aqueous salt solution comprises a mass ratio of monovalent ions to divalent ions in the range of 5 to 10, wherein the aqueous salt solution comprises sulfate ions;
applying a first pressure pulse of the aqueous salt solution to the formation using a pressure pulse tool; and applying a second pressure pulse of the aqueous salt solution to the formation using the pressure pulse tool, wherein the pressure differential between the pressure pulse tool and a formation pressure associated with the formation is in the range of 200 pounds-per-square inch (psi) to about 800 psi.

10. The method of claim 9, wherein the one or more salts are selected from the group consisting of sodium chloride, calcium chloride, magnesium chloride, sodium sulfate, magnesium sulfate, and sodium bicarbonate.

11. The method according to claim 9, wherein the monovalent ions comprise at least one of sodium ions and chloride ions.

12. The method according to claim 9, wherein the divalent ions comprise calcium and magnesium ions.

13. The method of claim 9, wherein the hydrocarbon-bearing reservoir comprises a carbonate reservoir.

14. The method of claim 9, comprising recovering displaced hydrocarbon from the hydrocarbon-bearing reservoir.

15. The method of claim 9, wherein preparing an aqueous salt solution comprises diluting seawater with fresh water to achieve the salinity of 5,000 ppm TDS to 7,000 ppm TDS.

16. The method of claim 15, wherein preparing the aqueous salt solution comprises adding at least one of the one or more salts to the diluted seawater.

* * * * *

UNITED STATES PATENT AND TRADEMARK OFFICE
CERTIFICATE OF CORRECTION

PATENT NO. : 10,738,233 B2  
APPLICATION NO. : 15/591810  
DATED : August 11, 2020  
INVENTOR(S) : Yousef et al.

Page 1 of 1

It is certified that error appears in the above-identified patent and that said Letters Patent is hereby corrected as shown below:

In the Claims

In Column 7, Line 11, Claim 11, should read:  
-- The method of claim 9, wherein the monovalent --

In Column 7, Line 14, Claim 12, should read:  
-- The method of claim 9, wherein the divalent --

Signed and Sealed this  
Fifteenth Day of September, 2020

Andrei Iancu  
*Director of the United States Patent and Trademark Office*